March 11, 1941.  P. ROBINSON ET AL  2,234,608
ELECTROLYTIC DEVICE AND THE MANUFACTURE OF SAME
Filed Nov. 24, 1934   2 Sheets-Sheet 1
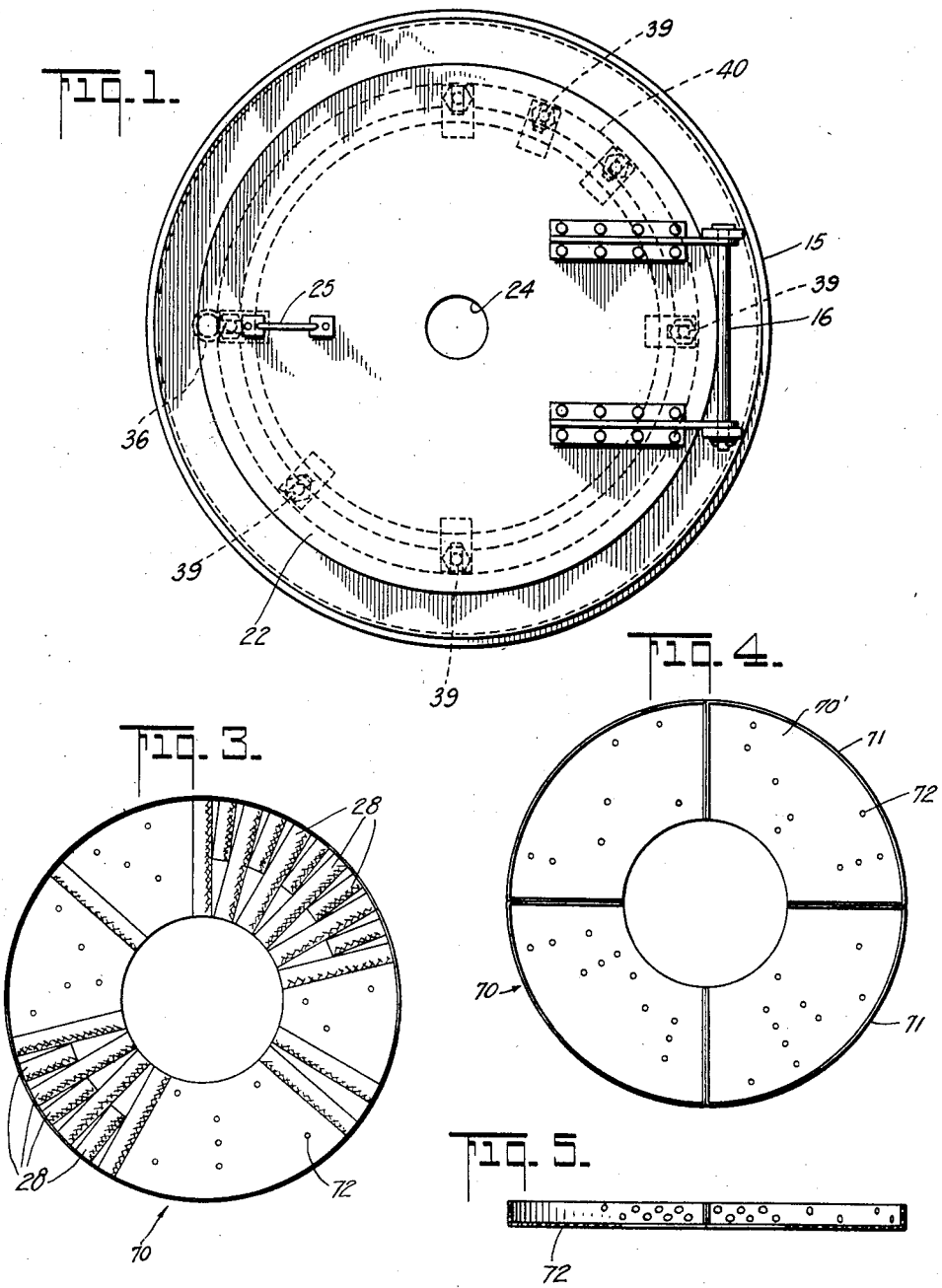
INVENTORS
Preston Robinson & Joseph L Collins
BY
Dorsey Cole
ATTORNEYS March 11, 1941.  P. ROBINSON ET AL  2,234,608
ELECTROLYTIC DEVICE AND THE MANUFACTURE OF SAME
Filed Nov. 24, 1934  2 Sheets-Sheet 2
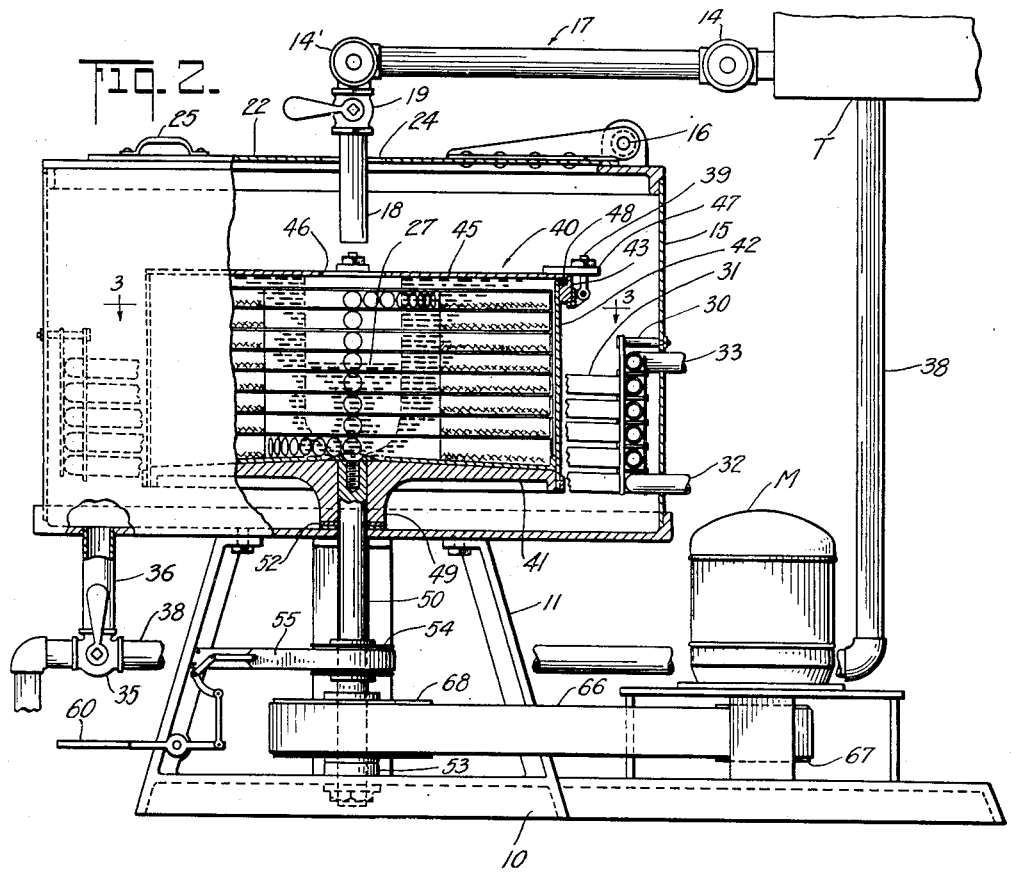
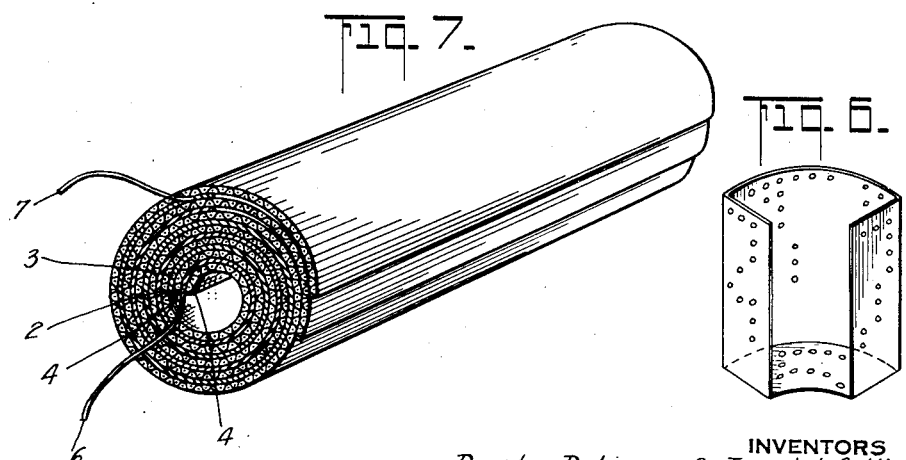
INVENTORS
*Preston Robinson & Joseph L. Collins*
BY *Dorsey Cole*
ATTORNEYS Patented Mar. 11, 1941

2,234,608

UNITED STATES PATENT OFFICE 2,234,608

ELECTROLYTIC DEVICE AND THE MANUFACTURE OF SAME

Preston Robinson, Williamstown, and Joseph L. Collins, South Boston, Mass., assignors to Sprague Specialties Co., North Adams, Mass., a corporation of Massachusetts Application November 24, 1934, Serial No. 754,668

26 Claims. (Cl. 175—315)

The present invention relates to the manufacture of electrolytic devices and more particularly to that of electrolytic condensers having a highly viscous or pasty electrolyte, and which condensers are generally referred to as "dry" electrolytic condensers.

Such condensers comprise, as a rule, two electrode foils of which at least one is of film-forming material, for instance, of aluminum, zirconium, tantalum, etc., while the other may be of film-forming metal or of non-filming material depending upon the type of condenser. Also depending upon the type of condenser, one or both of the electrodes are provided with a film, which is usually an electrolytically-formed oxide film. There is also generally provided between the electrode foils a separator, for instance, a spacer of gauze, crinoline, Cellophane, paper or like material, or combinations thereof, also serving as carrier of the viscous electrolyte.

The electrolyte as a rule comprises as ionogen a weak acid, for instance, boric acid, phosphoric acid, citric acid, etc., and preferably also a salt of a weak acid, which, however, does not need to be the salt of the acid used; the electrolyte also comprises an ionizing agent, which may consist of a polyhydric alcohol, for instance, glycerin, ethylene glycol, etc., and also preferably comprises a small but definite amount of water. The electrolyte may also comprise one or more inert substances which may serve to increase its viscosity and/or conductivity.

The present invention particularly relates to dry electrolytic condensers having electrolytes of the above type and having a viscosity, which when taken with a Stormer viscosimeter at a temperature of 95° C. is more than 1—up to 10 or more—when compared with the viscosity of water taken at a temperature of 25° C. and assumed as 1.

The advantages of our invention are particularly pronounced—but in no way limited to—for condensers having "pasty" electrolytes.

Suitable electrolytes for dry electrolytic condensers are at ordinary temperatures either extremely viscous liquids or "pastes" made up of a less viscous liquid and of inert solid constituents. For a given breakdown voltage the "pasty" electrolyte can contain a greater concentration of ions and therefore will have a lower electrical resistance than a viscous liquid electrolyte, and thus results in a condenser having a lower power factor, than it is possible to obtain with the viscous liquid electrolyte.

This seems to be due to the following: the breakdown voltage of the electrolytic condensers depends among other factors on the concentration of the negative ions in the electrolyte—traveling from the cathode towards the anode—and on the length of their effective path.

In a "pasty" electrolyte the concentration of ions can be relatively greater than in the viscous liquid electrolyte, because with the paste electrolyte the interposition of the inert solid particles provides for a greater length of path from cathode to anode.

Thus in most cases, to obtain a satisfactory power factor at a given breakdown voltage, it is preferable to provide a "pasty" electrolyte, namely, electrolytes which contain inert solid ingredients at the operating temperatures, i. e., up to 60–70° C.

The introduction of the electrolyte into the condenser preferably takes place after the electrode foil or foils to be filmed have been provided with the film, and as a rule takes place by one of the two following methods:

According to one method, the electrolyte is applied to the spacers, usually by manual coating, and at a temperature sufficiently high to render it plastic, whereupon the electrolyte-coated spacers are interposed between the electrode foils, which together with the spacers are wound into a roll or assembled into a stack.

The above method has various drawbacks, among others it requires a considerable amount of manual labor, involves difficulties in the handling of the coated spacers, results in much waste of the electrolyte, etc., and therefore is not well adapted for mass production.

According to the second method, the spacers, without their being previously coated with the electrolyte, are assembled with the electrode foils into rolls or stacks, hereafter referred to jointly as condenser "sections," and the sections are then impregnated with the electrolyte.

This method eliminates the various above-mentioned difficulties, as the unimpregnated spacers can be conveniently handled on winding machines, require less care in handling; such method also involves very little waste of electrolyte, etc., and seems altogether well adapted for mass production.

While this method is suitable for the manufacture of condensers the electrolyte of which is but slightly viscous at the impregnating temperature, especially if the exact composition of the electrolyte is not critical, such method has been found unsuitable for high quality dry condensers, especially for those having an electrolyte of a viscosity above 1.5 and with "pasty" electrolytes in general, as a thorough impregnation of the sections with such viscous electrolytes could either not be effected at all, or not without requiring too prolonged impregnation, or at least not without a considerable sacrifice of the quality of the condenser.

In the art of impregnation, to facilitate impregnation with viscous fluids, two means are usually resorted to; one is to impregnate at an elevated temperature, where the fluid is less viscous, and the other is to impregnate under vacuum to minimize the resistance offered by air or other gaseous contents of the device to be impregnated.

While most of the electrolytes used for dry condensers can be rendered more fluid by moderately heating them, even when heated, various such electrolytes remain sufficiently viscous as to require a too prolonged impregnation, or if the temperature is so increased as to render them sufficiently fluid for a more rapid impregnation, heating to such temperatures causes a loss in the volatile constituents of the electrolyte, which deleteriously affects the ultimate characteristics of the condenser.

Similarly, impregnation under vacuum is objectionable, especially if the water content of the electrolyte is critical with regard to the ultimate properties of the condenser. As has been set forth in the copending patent application of Preston Robinson Ser. No. 548,270 now U. S. Patent No. 2,057,314, the water content of the electrolyte is to be kept within narrow and predetermined limits for high-grade dry electrolytic condensers. Such electrolytes require, as a rule, a water content of between 5 and 30% of the liquid portion of the electrolyte, and for any given type of condenser the water content should be kept within 1-2% of the value determined to give the best results. Impregnation under vacuum causes an evaporation of the water and therefore is unsuitable in the manufacture of such condensers.

With pasty electrolytes there are additional reasons why usual impregnating methods cannot be successfully used. Such pasty electrolytes when heated to moderately elevated temperatures (90–100° C.) do not form as a rule a clear solution, even though the viscosity of their liquid portion decreases. Such electrolytes usually can be made into clear solutions by heating them to still higher temperatures, for instance, about 130–150° C., (while using excess pressures to prevent evaporation), or by adding solvents to the electrolyte in sufficient quantities to form a clear solution and thereafter distilling off the added solvent at an elevated temperature.

Both of these methods usually result in the formation, at the impregnating temperature, of a supersaturated solution, that is to say, a solution in which there is a tendency for the excess solid matter to precipitate.

If such a supersaturated electrolyte is thus prepared and left standing, a precipitation of its solid particles takes place. Disregarding other factors, at a given temperature the rate at which such precipitation—to relieve supersaturation—takes place accelerates, i. e. it is quite slow at first (after the electrolyte has been cooled down from the temperature at which it forms a clear solution), and then accelerates, the effect being a cumulative one, whereby the initially precipitated particles assist in the precipitation of further particles. In general with pasty solutions of the above type, the solution will remain practically clear for a period of about five to ten minutes, the precipitation being almost negligible in the first few minutes. After this the solution becomes cloudy with a gradually increasing precipitation, until after twenty to forty minutes the entire solid excess has precipitated.

It will be thus realized that if such a pasty electrolyte can be rapidly heated to a temperature at which it is a true clear solution, without at this temperature markedly changing its character, and then cooled down rapidly to a temperature at which its liquid portion is sufficiently liquid, (but has a tendency of precipitating solid particles), and provides for a sufficiently rapid impregnation as to prevent such precipitation, satisfactory impregnation can be achieved. On the other hand, if the electrolyte is heated too long to obtain a clear solution and its character is thereby changed, or after its being cooled down to the impregnating temperature the impregnation requires too long a time, satisfactory impregnation is impossible. If the impregnation requires, for instance, twenty minutes or more, the sections will be impregnated by an electrolyte of non-uniform character, as filtration takes place, whereby the section is primarily impregnated only with the liquid portion of the electrolyte, whereas the solid excess deposits on the outside of the section and in the bottom of the impregnating tank.

From the above it will thus appear that a successful impregnation with an electrolyte of the pasty type, i. e., which contains uniformly dispersed solid inert particles in its mass at the normal and operating temperatures of the condenser, can only be achieved if it is possible to thoroughly impregnate the condenser in a time period which as a rule is less than ten minutes and preferably less than five minutes.

According to our invention the assembled condenser sections are impregnated in a comparatively short time, and preferably in less than 10 minutes—using neither vacuum nor temperatures causing deleterious changes in the electrolyte or evaporation of its water or other volatilizable constituents—the impregnating speed being accelerated by impregnating the assembled condenser sections in a centripetal field, in such a manner that a sufficiently high differential pressure is established between the inner and outer end faces of the sections to force the electrolyte into the section and to effect its thorough impregnation in such a short time interval.

An object of our invention is, therefore, to provide a process to impregnate assembled condenser sections with a viscous electrolyte by using a centripetal pressure head and an apparatus to practice this process.

Another object of our invention is to provide a process for the successful impregnation with "pasty" electrolytes.

A further object of the invention is to dispose the condensers for their impregnation with their length axis substantially in the main direction of the centripetal pressure head.

A still further object of our invention is to facilitate the impregnation by drying and preheating the condenser sections prior to their impregnation, and also preheating the electrolyte, supporting trays, etc., and to maintain during the impregnation a moderately elevated temperature which, however, is too low to deleteriously affect the electrolyte.

A further object of the invention is to provide for dry condensers the spacers of which are non-absorbent and for a method of impregnating same.

Various other novel features and advantages of our invention will appear as the specification progresses.

In the drawings forming part of the specification:

Figure 1 is a top view of a centripetal impregnator according to the invention.

Fig. 2 is a partly sectionized side view showing schematically an impregnating installation according to the invention.

Fig. 3 is a section taken along the lines 3—3 of Fig. 2.

Fig. 4 is a plan view of one form of the condenser tray.

Fig. 5 is a sectionized side elevation of the condenser tray of Fig. 4.

Fig. 6 is a perspective view of another type of condenser tray.

Fig. 7 is a perspective view of a condenser section before its impregnation.

The impregnating apparatus, which comprises a rotatable impregnating tank 40, disposed within a cylindrical vat 15, and a motor M for the rotation of the tank 40, is mounted on a base plate 10, on which may be also mounted an electrolyte reservoir tank T.

The vat 15 is stationary, and carried on the base 10 by means of three legs 11. The vat 15 is provided with a cover 22 hinged at 16 and which can be swung open by means of a handle 25. The cover 22 is provided with a central aperture 24.

Secured to the inner side of the vat 15, by means of supports 30, and surrounding at least the lower half of the tank 40, is provided a system of heating coils 31, connected by means of pipes 32 and 33 leading through the vat 15, to a suitable heat-supply system, preferably to a steam supply (not shown).

The impregnating tank 40 is disposed concentrically within the vat 15, and is provided with a bottom 41, a cylindrical side wall 42 and a removable cover 45. The cover 45 is provided with a central aperture 46, aligned with the aperture 24 of cover 22. If desired the aperture 46 can be closed by a suitable closure plate (not shown). Around the edge of side wall 42 and nested in a peripheral flange 43 of tank 40, is provided a circular sealing gasket 48. The cover 46 can be tightly secured to the tank by means of closely spaced swing bolts 39 provided on flange 43 and cooperating with lugs 47 of the cover, tightly securing the cover 46 to the tank 40, whereby the compressed gasket 48 insures a liquid-tight seal along the periphery of the tank.

The bottom 41, of tank 40, is preferably formed as a comparatively thick-walled casting, provided with a downward extending hub 49, through the bore of which passes the vertical driving shaft 50 of the tank 40, the shaft 50 being fixedly connected to the hub 49 and forming therewith a liquid-tight seal. A suitable thrust bearing for the shaft 50 is formed by the bottom face of hub 49 bearing on the bottom of vat 15 by means of interposed washers 52. At its lower end the shaft 50 is journaled in a bearing 53 carried by the base plate 10.

The shaft 50 can be driven by a suitable motor indicated as an electric motor M, the motor M and driving shaft 50 being inter-connected by suitable driving means shown as a belt 66, and pulleys 67 and 68.

To obtain a quick stoppage of the rotating tank, braking means are preferably provided, such being indicated by a brake drum 54 mounted on the shaft 50, and a corresponding band brake 55, one end of which is anchored to one of the supporting legs 11, whereas its other end is controlled by a foot pedal 60, hinged on the leg 11.

Preferably a timing device (not shown) is connected to the motor and upon pressing of a button starts rotation of the tank and stops such rotation (preferably also applying the brakes), after a preadjusted time interval.

The electrolyte reservoir T, indicated schematically, is preferably a tank of a size adapted to hold sufficient electrolyte supply for one or two loadings of the tank 40 and is fed at a rate commensurate with the electrolyte consumed in the impregnation. The reservoir T is in practice disposed higher than is the tank 40 so that the electrolyte can be supplied therefrom to tank 40, by gravity.

The electrolyte is preferably preheated in tank T to a temperature slightly above that used during the impregnation. The temperature and duration of heating the electrolyte in the tank should be such as not to deleteriously affect the electrolyte, but should be sufficient as to obtain a clear solution also in case of pasty electrolytes.

The electrolyte is supplied from the tank T to the impregnating tank 40 either by means of a flexible metal hose or preferably by means of a pipe system 17 which is provided at the exit of the tank T and at the opening 24 of vat 15 with swinging joints 14 and 14' respectively, the joint 14 permitting the swinging of the pipe about the tank T, whereas the joint 14' permitting a short pipe 18 to be swung individually. A suitable cut-off valve 19 is provided, preferably disposed between the joint 14' and pipe 18.

The condenser section as shown in Fig. 7 comprises two metal foils 2 and 3, which are preferably both of aluminum, even if only one of the electrodes is to be filmed, and are separated by spacers 4 which, as will be later explained, do not need to be of absorbent material. The electrode foils are provided with terminal leads 6 and 7 shown as wires; however, these leads may be formed as integral extensions of the electrode foils. In case the condenser is to be used in rectified current circuits, as a rule only one of the electrodes, namely, the anode, is to be filmed, whereas in alternating circuits both electrodes are filmed, the film formation taking place preferably by the processes described in the copending applications Ser. No. 548,270 and Ser. No. 741,493, of Preston Robinson, now U. S. Patents No. 2,057,314 and No. 2,057,315, respectively.

The electrode foils are then wound together into a roll, as a rule with interposed spacers, made for example, of the previously enumerated absorbent materials. Instead of forming the condenser section as a roll it may be formed as a stack in which case a plurality of aluminum foils with intermediate spacers are assembled into a stack, alternate foils being interconnected to form the two electrodes of opposite polarity.

The assembled sections (wound rolls or assembled stacks) which may be held in shape by a rubber band or by twine, are preferably first submitted to heating and drying, so that when brought into the tank they are free from moisture and preheated to a temperature of between 40–70° C.

The condensers are placed in individual trays or baskets 70 (see Figs. 3, 4 and 5). The trays, which are also preferably preheated before or after they receive the sections, are of annular shape having upturned outer peripheral rims 71 and in some cases also similar inner rims, the rims as well as the bottom of the trays being provided with apertures 72. The trays may also consist of meshed wire. In case of large diameter tanks, the trays are preferably subdivided into segmental portions, for instance, into the quadrants 70' shown in Fig. 4.

The sections are placed into the trays side by side, with their length axes disposed radially, the sections abutting with their ends against the outer and inner rims, and substantially completely filling the tray. It is also possible to provide trays having a radial width corresponding to the double, triple, etc. length of a section or to provide a plurality of concentric trays, and to place therein correspondingly two or more concentric rows of radially aligned condenser sections.

With the pipes 17—18 swung out of the way, the cover 22 of housing 15 is lifted and cover 45 of tank 40 removed.

The individual trays so filled with the condenser sections 28 are then placed into the tank 40, on top of each other, whereby the tank is substantially completely filled by the trays. The cover 46 is then bolted down by means of the swing bolts 39 whereby a tight seal is obtained around the periphery of the tank due to the compression of the gasket 48. Subsequently the cover 22 or vat 15 is also closed.

To admit the electrolyte into the tank 40, the electrolyte supply pipe system 17 is brought into a position as to permit its component pipe 18 to project through opening 24 into the vat 15, which also brings pipe 18 into alignment with the opening 46 of the impregnating tank 40.

Upon opening of the valve 19, the electrolyte 27 is transferred in the desired amount from the reservoir T to the tank 40. As stated, the electrolyte is preferably preheated in the reservoir T, usually to a temperature of 100–120° C. depending upon the electrolyte used. The determination of the proper amount of electrolyte to be admitted into the tank 40 will appear from the following:

With the condenser sections 28 and the electrolyte 27 provided in the tank, the tank 40 is set into rotation by means of the electric motor M. Rotation of the tank exerts a centrifugal force on the electrolyte, which thereby assumes a position the inner contour line of which is indicated by semi-dotted lines, and thereby provides for a central, electrolyte-free space, which has the shape of a flattened paraboloidal rotation body.

The electrolyte is thus forced outwardly with the creation of a space void of electrolyte in the central portion of the tank, whereas in the outer portion of the tank, where the sections are disposed, the electrolyte reaches up to the top of the tank. Thus all of the condenser sections are fully submerged in the electrolyte during the rotation of the tank. Thereby a centripetal pressure head of such magnitude is established between the outer and inner end faces of the sections as to radially (corresponding to the axial direction of the sections) force the electrolyte into the sections and thereby cause their thorough impregnation in a comparatively short time.

From the above it thus appears that the proper amount of electrolyte to be admitted in the tank 40 is determined by the requirement that all sections placed in the tank be fully submerged in the electrolyte while the tank is in rotation. Instead of admitting the electrolyte before starting the tank to rotate, the electrolyte may be also admitted with the tank already in rotation.

The impregnation of the sections takes place by the combined action of the impact (absolute pressure) exerted by the electrolyte on the sections and of the differential pressure established between the outer and inner end faces of the condenser sections. Thus satisfactory impregnation depends both on the absolute value of the centripetal force and on the differential pressure exerted during impregnation, and it is difficult to properly determine to what extent the absolute pressure and the differential pressure respectively, are individually responsible in obtaining the desired results.

Satisfactory results have been obtained for instance, with absolute pressures ranging from 50–175 pounds per square inch, and with differential pressures between the two end faces of the condenser ranging from 10–30 pounds per square inch per linear inch. The absolute value of the prevailing centripetal force depends on the dimensions of the tank, the speed of rotation, density of the electrolyte, and disposition of the sections, whereas the differential pressure also depends on the axial length of the condenser sections. In this connection it should be noted that the largest forces are obtained if the condenser sections fall with their length axes in the main direction of the centripetal forces.

The main direction of the centripetal field forms as a rule a slight angle with the horizontal, and under such conditions the best results are obtained with trays the bottoms of which form a corresponding angle with the horizontal; for example, trays the bottoms of which rise outwardly to form an angle of about 15° with the horizontal. However, for practical considerations, and as the results are not greatly different, we prefer to use trays having horizontal bottoms and thus place the condenser sections horizontally into the tank.

For a tank of given dimensions and a given speed of rotation the duration and temperature of the impregnation depends upon various factors, and primarily upon the viscosity of the electrolyte at the impregnating temperature and the linear length of the condensers.

As a rule we prefer to rotate the tank at speeds of about 1200 and 1800 R. P. M., whereby the higher the speed of rotation, the greater the centripetal head obtained. The duration of impregnation may vary between a few seconds to several minutes depending upon the electrolyte; for instance, when impregnating sections 4" long at a temperature of 95° C. with an electrolyte having a viscosity of 3 at this temperature, a time of impregnation of about five minutes is required as a rule, whereas less viscous electrolytes and shorter sections require correspondingly less time.

With various electrolytes and in general with such electrolytes which do not contain solid material in suspension, and which are unsaturated at a temperature of 95° C., a practically continuous process of impregnation is possible in which, after the completed impregnation and removal of one batch of condenser sections, the electrolyte which remains in the tank is supplemented by fresh electrolyte, so as to again fill up the tank to the proper extent for the impregnation of the next batch.

This process can be applied successfully to various highly viscous liquid electrolytes—for instance one containing 640 cc. glycol, 700 grams boric acid and 100 cc. aqua-ammonium, heated before impregnation to 140° C., as well as to various pasty electrolytes, for instance one containing 640 cc. glycol, 800 grams ammonium pentaborate, and heated before impregnation to 128° C. In either case, however, and especially in the case of pasty electrolytes, it is essential that the impregnation take place within a short time, as above specified.

Such a substantial "continuous" impregnating process is preferably so arranged that at least about 50% of the electrolyte will be removed from the tank in the form of finished condensers. Thereby all of the electrolyte is fully utilized without requiring the process to be interrupted by drainage and/or regeneration of the electrolyte.

Such process, however, is not suited for such electrolytes which undergo essential changes during impregnation, due to chemical reactions and/or loss of volatile constituents.

To avoid the loss of volatile constituents, especially of water vapor, when such electrolytes are used the opening 46 of the impregnating tank 40 is blanked during impregnation. However, even without the escape of water vapor, certain electrolytes may deteriorate, because of the crystallization which may take place at the impregnating temperature. The result is that in case of these last-named electrolytes the successive impregnation render remnants of the electrolyte less and less suitable for further use.

When using such electrolytes, for instance 640 cc. glycol, 1600 grams boric acid and 200 cc. ammonia water heated prior to impregnation to 130° C., the electrolyte remaining in the tank after one or more impregnations, is drained off. This can be effected after the removal of the impregnated sections by rotating the tank 40 with its cover 45 removed. The electrolyte left in the tank thereby rises and flows out around the edge of the tank 40 and into the vat 15. The vat 15 can then be drained through a pipe 36 by opening a drain-valve 35. The so-drained electrolyte can be as a rule rendered suitable for further use by a proper regenerating process.

If it is desired to empty the impregnating tank 40 for some other reasons, but the electrolyte is suitable for re-use without regeneration, the content of tank 40 can be emptied into vat 15 by the same procedure as above set forth, but the electrolyte, instead of being drained off, is passed through the opening of the valve 35 through a pipe 38 into the electrolyte reservoir T, by means of a pump (not shown).

In some cases, where the electrolyte during one impregnation, changes to such an extent as to make it unsuitable, or at least less suitable for a second impregnation, regeneration of the electrolyte may be achieved by the simple addition of a suitable amount of fresh electrolyte of suitable composition. For instance, an electrolyte containing 640 cc. glycol, 1400 grams boric acid, 200 cc. ammonia water, and previously heated (open to the air) to 127° C., when used for impregnation at a temperature of about 100° C., and with a completely closed tank so as to prevent loss of water—will become more viscous solely on account of the crystallization of boric acid.

Such an electrolyte after its use can be regenerated to its original state by mixing it with an equal amount of fresh electrolyte, having the above given constituents and heating this mixture to 127°.

The reason for this is, that in mixing one part of the old electrolyte, with the fresh electrolyte, after first heating the mixture until all constituents both of the old electrolyte and of the fresh electrolyte form clear solutions, a heating to 127° will cause some water to be evaporated from the mixture, whereby the capacity of the electrolyte to dissolve all constituents decreases so that in a subsequent impregnation at 100° C. a crystallization of the boric acid will take place in the same manner, as if an entirely fresh electrolyte were used.

To remove from the condenser such outside crust as usually forms around the impregnated condenser sections and on the extending electrode terminals, we prefer for the removal of such crust, to subject the impregnated condensers to further treatment in a solution of a weak acid and preferably an acid which is the same as the acid used in the electrolyte, or at least not stronger than this acid; this treatment being described and broadly claimed in the copending application Ser. No. 683,514 now Patent No. 1,998,202 of Preston Robinson.

This treatment may take place immediately after impregnation and in the impregnating tank in such a manner that after the impregnation of the condensers has been effected the electrolyte is drained off, after which the condensers are subjected to spraying with a saturated aqueous solution of a weak acid, preferably with the tank placed in rotation. After this the solution is drained off and the condensers may be dried also with the tank in rotation.

The acid solution may be introduced into the tank 40 in the same manner as the electrolyte, or it may be introduced by means of a jet or jets while the tank is rotating. The removal of the electrolyte crust, however, can take place also as a separate operation after the removal of the impregnated condensers from the impregnator.

Instead of using a plurality of trays placed on top of each other a single cylindrical tray or basket, preferably divided into individual sectional pieces, as is shown in Fig. 6, may be used in which the condenser sections are placed in rows directly on top of each other. As is shown in Fig. 6, the inner rim of the tray is altogether dispensed with. Provision of inner rims is as a rule unnecessary for any type of tray as the centrifugal force tends to push the condensers outwardly and no danger exists for the sections to slip inwardly while the tank is rotating.

The process of our invention not only greatly reduces the manufacturing expenses of dry electrolytic condensers by reducing the amount of labor involved, amount of time consumed, eliminating waste, etc., but also provides for condensers of greater uniformity and having better characteristics.

Furthermore, the process of our invention renders it possible to make novel types of condensers having for various purposes inherent advantages over known types of condensers. The known dry electrolytic condensers, as stated, as a rule comprise a spacer, and in accordance with the manufacturing processes previously used, this spacer should be an absorbent spacer, so as to serve as a carrier for the electrolyte.

Dry electrolytic condensers of this type, when used under difficult operating conditions, for instance, when operating in an atmosphere of high humidity, markedly deteriorate during operation.

We have found that this drawback can be eliminated by making dry electrolytic condensers in which the separators are non-absorbent and which thus do not absorb the electrolyte, the electrolytic being interposed between the separator and the adjacent electrode foils. Such condensers can be conveniently made by the process in accordance with the invention where the impregnation does not depend, or at least not to a marked extent, upon the absorbing properties of the separator.

The process of the invention, therefore, permits the thorough and satisfactory impregnation of condensers having spacers or separators which are altogether nonabsorbent. Such non-absorbent separator may be formed, for instance, of non-absorbent fibrous material as wax or starch, or of fibrous material which has been rendered non-absorbent by prior impregnation with a substance, for example, asbestos, which renders the fibrous material non-absorbent and is itself non-absorbent. Between such a non-absorbent spacer and the electrolyte no interaction will take place even under difficult operating conditions.

While we have described our invention in connection with specific examples and specific process steps, it should be well understood that such are given merely as illustrations. For instance, various modifications of the impregnating process or of the apparatus used may suggest themselves to one skilled in the art. Also, the values of the centripetal forces, differential pressures, rotation speed, etc., are merely illustrative, and such values may vary within wider ranges than given herein because of the wide range of viscosities, condenser sizes, impregnating temperatures involved.

The electrolytes used to practice the invention may have a wide range of composition. As a rule the electrolytes used in connection with the invention comprise preferably as ionogens weak acids and salts of weak acids (which salts, however, do not need to be the salt of the weak acids used), the acids being preferably weak acids, as boric acid, phosphoric acid, citric acid, tartaric acid, etc., and the salts are preferably alkali metal or ammonium salts of such acids; however, the ionogen may also consist of an acid without a salt, and the acid may be a stronger acid, for example, sulphuric acid. The ionogen may even be a salt or an alkali.

Also, regarding the ionizing solvent, while it preferably comprises a polyhydric alcohol, as glycerol, ethylene glycol, etc., and a definite amount of water, other types of solvents, for instance, carbohydrates, may be used. The electrolyte, as stated, may also comprise inert substances to increase its viscosity; for instance, bentonite, starch, boric acid, etc., (this being the rule in pasty electrolytes), and also substances to increase its conductivity, as finely divided graphite, magnetite, etc.

Instead of using aluminum foil other film-forming materials, for instance, zirconium, tantalum, etc., may be used for the filming electrode, and in case of condensers having only one of their electrodes filmed, the non-filmed electrode may consist of non-filming metal.

As various other modifications of our invention may suggest themselves, we do not wish to be limited to the specific process steps, apparatus and materials disclosed, but desire the appended claims to be construed as broadly as permissible in view of the prior art.

What we claim is:

1. In the manufacture of dry electrolytic condensers, the steps which comprise, subjecting a condenser section to impregnation with an electrolyte at an elevated temperature, prolonged effect of which temperature deleteriously changes the character of said electrolyte, and completing said impregnation within a time interval too short to effect deleterious changes in the electrolyte.

2. In the manufacture of dry electrolytic condensers, the process which comprises, subjecting a condenser section to impregnation at a temperature of about 90 to 100° C. with an electrolyte having at this temperature a viscosity greater than 1 and completing the impregnation of said section in a time interval of less than ten minutes.

3. In the manufacture of dry electrolytic condensers, the steps which comprise, impregnating a condenser section with an electrolyte consisting of a supersaturated clear solution in a time interval which is insufficient to cause a marked precipitation of solid ingredients from said solution.

4. In the manufacture of dry electrolytic condensers the steps comprising, heating a pasty electrolyte which comprises at temperatures up to 60° C. solid inert particles dispersed in the electrolyte to a temperature at which it forms a clear solution, rapidly cooling said solution to obtain a supersaturated clear solution, and subjecting a condenser section to impregnation with the supersaturated clear solution, and completing said impregnation before substantial precipitation of inert particles from the solution can take place.

5. In the manufacture of dry electrolytic condensers, the process which comprises, impregnating a condenser section in a centripetal field with an electrolyte having a viscosity greater than 1 at the impregnating temperature.

6. In the manufacture of dry electrolytic condensers, the process which comprises the steps, assembling a filmed electrode foil and a second electrode foil, together with a spacer to form a condenser section, and impregnating said section in a centripetal field with an electrolyte having at the impregnating temperature a viscosity greater than 1.

7. In the manufacture of electrolytic condensers, the process which comprises, preparing an electrolyte of an ionogen and an ionizing solvent and of substances which at normal temperatures are dispersed as solid particles therein, heating said electrolyte to a temperature at which said particles are completely dissolved and the electrolyte forms a clear solution, slightly cooling said electrolyte to a temperature at which the solution is supersaturated and remains clear for a short time-interval, and impregnating in a centripetal field condenser sections with said supersaturated electrolyte in a time interval insufficient for a marked precipitation of solid particles from the electrolyte.

8. In the manufacture of dry electrolytic condensers, the process which comprises, adding to an electrolyte comprising an ionogen and a viscous solvent, an inert substance to give the electrolyte at room temperature a pasty consistency, heating said pasty electrolyte to a temperature exceeding 100° C. to obtain a clear solution, cooling said electrolyte to a temperature of about 90° to 100° C., and impregnating under the action of a centripetal field assembled condenser sections with the electrolyte at a temperature of about 90° to 100° C., and completing said impregnation in a time interval which is insufficient for a pronounced precipitation of particles of said inert substance.

9. In the manufacture of dry electrolytic condensers, the process which comprises, placing elongated condenser sections into a rotatable impregnating tank with their length axes in a direction substantially perpendicular to the rotation axis of the tank, and impregnating said sections with viscous electrolyte while rotating the tank at a speed of 1200 to 1800 R. P. M.

10. In the manufacture of dry electrolytic condensers, the process which comprises, placing in a rotatable cylindrical tank batches of assembled condenser sections radially disposed in a plurality of substantially horizontal planes, and impregnating said sections at a temperature of about 100° C., with a viscous electrolyte while rotating said tank to exert a centripetal force on the electrolyte sufficiently large to cause a thorough impregnation of the sections in a time interval of less than 10 minutes.

11. In the manufacture of dry electrolytic condensers, the process which comprises, placing in a rotatable tank a plurality of assembled condenser sections radially disposed in said tank, and impregnating said sections with a viscous electrolyte while rotating said tank to cause said electrolyte to exert an absolute pressure head of the order of 50–100 pounds and a differential pressure of 10–30 pounds per square inch per linear inch on said sections.

12. In the manufacture of dry electrolytic condensers, the process which comprises, disposing in a rotatable cylindrical tank batches of assembled condenser sections radially in a plurality of horizontal planes, partly filling said tank with an electrolyte having a viscosity greater than 1 at a temperature of about 100° C., heating said tank to a temperature of about 100° C., subjecting said tank to rotation to submerge in the electrolyte all of the sections and to exert a centripetal force of sufficient magnitude to cause a through impregnation of the sections in a time interval of less than five minutes.

13. In the manufacture of dry electrolytic condensers, the process which comprises, placing a batch of condenser sections into a rotatable impregnating tank, admitting an original fresh and supersaturated electrolyte into said tank, rotating said tank to impregnate in a centripetal field said condensers with part of said electrolyte, at a temperature at which partial crystallization of the electrolyte takes place, removing the impregnated sections from said tank and leaving in said tank the excess of electrolyte, admitting to said tank a fresh electrolyte, which together with the remaining electrolyte forms a mixture having the properties of the original electrolyte, and impregnating in said mixture a second batch of condenser sections.

14. In the manufacture of dry electrolytic condensers, the process which comprises, impregnating condenser sections with a viscous supersaturated electrolyte in a rotatable impregnating tank, heating said tank to a temperature of about 80° to 110° C., partly filling said tank with an electrolyte comprising volatilizable ingredients and ingredients which are adapted to crystallize at such temperature, sealing said tank to prevent the evaporation of said ingredients, rotating said tank to impregnate said sections, removing said impregnated sections, regenerating the remaining electrolyte in the tank by fresh electrolyte to counteract partial crystallization of the ingredients of the electrolyte which takes place during the first impregnation.

15. In the manufacture of electrolytic condensers, the process which comprises, placing into a centripetal field elongated condenser sections with their length axis in a direction extending substantially in the main direction of the centripetal field and impregnating said sections in said centripetal field with a supersaturated clear solution of an electrolyte and at a temperature at which solid particles precipitate from the solution after a time interval exceeding about 10 minutes.

16. In the manufacture of electrolytic condensers, the process which comprises, assembling a filmed electrode foil and a second electrode foil together with a non-absorbent spacer to form a condenser section, and impregnating said section in a centripetal field with an electrolyte having at the impregnating temperature a viscosity greater than 1.

17. In the manufacture of dry electrolytic condensers, the process which comprises, impregnating a condenser section with a supersaturated clear solution of an electrolyte at a temperature of about 90° to 100° C. under the action of a centripetal field, and completing said impregnation in a time interval which is insufficient for a pronounced precipitation of solid ingredients from said supersaturated solution.

18. In the manufacture of dry electrolytic condensers, the process which comprises, placing cylindrical condenser sections into a rotatable impregnating tank with their length axes in a direction substantially perpendicular to the rotation axis of the tank, and impregnating said sections with viscous electrolyte while rotating said tank.

19. The method of impregnating electrical condensers comprising interleaved conductive and absorbent or insulating elements consisting in placing the condensers in a tank containing a liquid compound, revolving said tank to force said compound into the interstices of the condenser by centrifugal pressure, said condensers being so disposed that they extend lengthwise or partly lengthwise across areas of different pressures in the impregnating liquid.

20. The method of impregnating absorbent articles consisting in placing the articles in a container with a liquid impregnating compound therein, maintaining said compound in a continued forced circulation in contact with the articles, said articles being placed in such a manner that opposite ends thereof are in contact with portions of said compound moving at different peripheral speeds whereby said compound is forced into said articles by centrifugal pressure.

21. The method of impregnating electrical condensers comprising subjecting an impregnating liquid in which the condensers are immersed to centrifugal action, subjecting openings at different parts of the condensers to different centrifugal pressures of the liquid whereby the liquid under centrifugal operation replaces fluids of different specific gravity that were in the condensers at the start.

22. A device for impregnating porous articles comprising a tank, an impregnating compound therein, means for placing articles to be impregnated in said tank adjacent the outer walls thereof and to maintain the articles immersed in said compound at all rotational speeds of the tank, means for rotating said tank to force said compound into the interstices of said articles by the action of centrifugal pressure, and partition means to hold said articles in the same position relative to the axis of rotation during rotation of said tank.

23. A device for impregnating porous articles comprising a tank, an impregnating compound therein, means for placing articles to be impregnated in said tank adjacent the outer walls thereof and to maintain the articles immersed in said compound at all rotational speeds of the tank, means for rotating said tank to force said compound into the interstices of said articles by the action of centrifugal pressure, and a perforated partition and supporting means to hold said articles individually in position during the rotation of said tank and to allow ready access of the impregnating compound to the articles to be impregnated.

24. A device for impregnating a porous article comprising a container, an impregnating compound partly filling the same, said container providing means for maintaining opposite ends of an article to be impregnated in different pressure areas in said compound during revolution of said container, and means for revolving said container together with said compound and article to establish areas of different pressure in the compound by centrifugal action thereon and thereby to force the compound into the interstices of said article.

25. A device for impregnating porous articles comprising, a tank, an impregnating compound therein, means for placing articles to be impregnated in said tank including partitioning means to hold said articles in the same position relative to the axis of rotation during the rotation of said tank, and means for rotating said tank to force said compound into the interstices of said articles by the action of centrifugal pressure.

26. An apparatus for impregnating electrical condensers comprising a frame, a motor-driven shaft supported therein, a circular cup-like container for an impregnating liquid also supported in said frame and operatively connected to said shaft, and a set of removable holders in said container each adapted to hold individually a plurality of condensers in predetermined fixed position during operation, said holders being perforated to promote free circulation of the impregnating liquid and a heating coil cooperating with the container to heat the impregnating liquid.

PRESTON ROBINSON,
JOSEPH L. COLLINS.